(12) United States Patent
Kim et al.

(10) Patent No.: US 6,792,198 B1
(45) Date of Patent: Sep. 14, 2004

(54) METHOD AND APPARATUS FOR RECORDING DIGITAL DATA STREAMS AND MANAGEMENT INFORMATION

(75) Inventors: Byung-Jin Kim, Kyunggi-do (KR); Kang-Soo Seo, Kyunggi-do (KR); Jea-Yong Yoo, Seoul (KR); Ki Won Kang, Seoul (KR)

(73) Assignee: LG Electronics Inc., Seoul (KR)

(*) Notice: Subject to any disclaimer, the term of this patent is extended or adjusted under 35 U.S.C. 154(b) by 957 days.

(21) Appl. No.: 09/588,661

(22) Filed: Jun. 6, 2000

(51) Int. Cl.⁷ ............................................... H04N 5/781
(52) U.S. Cl. ........................ 386/111; 386/124; 386/125; 360/8; 360/32; 369/124.06
(58) Field of Search ............................... 386/1, 33, 45, 386/109, 111, 112, 125, 126, 95, 124; 360/8, 32; 369/59.1, 59.23, 59.25, 59.26, 59.27, 60.01, 124.01, 124.06, 124.08, 124.07, 275.3; H04N 5/91, 5/76, 5/92, 5/781

(56) References Cited

U.S. PATENT DOCUMENTS 5,917,830 A * 6/1999 Chen et al. ................. 370/487
6,701,059 B1 * 3/2004 Yoo et al. ..................... 386/46
2003/0091339 A1 * 5/2003 Isozaki ........................ 386/96
2004/0071448 A1 * 4/2004 Yoo et al. .................... 386/111

* cited by examiner

Primary Examiner—Thai Tran
(74) Attorney, Agent, or Firm—Birch, Stewart, Kolasch & Birch, LLP (57) ABSTRACT

Method and apparatus for recording digital data transport stream units such as application packets in sectors of a disk type recording medium such as a digital versatile disk and create and record management information for the recorded transport stream units. In case that a single transport stream unit is divided and then recorded across two sectors, header information of the preceding sector including management information which is created corresponding to each transport stream unit is generated, and the size of the header information and transport stream units to be recorded in the preceding sector is compared with the size of a sector. If the size difference is 1 byte, an invalid header data distinguishable from normal application header extension information is inserted to maintain the correspondence between each transport stream unit to be recorded in the preceding sector and its management information.

20 Claims, 6 Drawing Sheets

FIG. 1

Conventional Art

FIG. 2

*Conventional Art*

FIG. 3

Conventional Art

FIG. 4

*Conventional Art*

METHOD AND APPARATUS FOR RECORDING DIGITAL DATA STREAMS AND MANAGEMENT INFORMATION

BACKGROUND OF THE INVENTION

1. Field of the Invention

The present invention relates to method and apparatus for recording digital data streams and their management information, which record digital data transport stream units such as application packets in predetermined-sized sectors of a disk-type recording medium such as a digital versatile disk (referred as 'DVD' hereinafter) and create and record management information for the recorded transport stream units.

2. Description of the Related Art

In the conventional analog television broadcast, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards the digital broadcast.

The digital broadcast offers several advantages that its analog counterpart cannot provide. For example, the digital broadcast is capable of providing services with far more improved video/audio quality, transmitting several different programs within a fixed bandwidth, and offering enhanced compatibility with digital communication media or digital storage media.

In the digital broadcast, a plurality of programs encoded based upon the MPEG format are multiplexed into transport streams before transmitted. The transmitted transport streams are received by a set top box at the receiver and demultiplexed into original programs. If a program is chosen among the demultiplexed programs, the chosen program is decoded by a decoder in the set top box and original audio and video signals are retrieved. The retrieved audio and video signals are then presented by an A/V output apparatus such as a TV.

Figure 1:
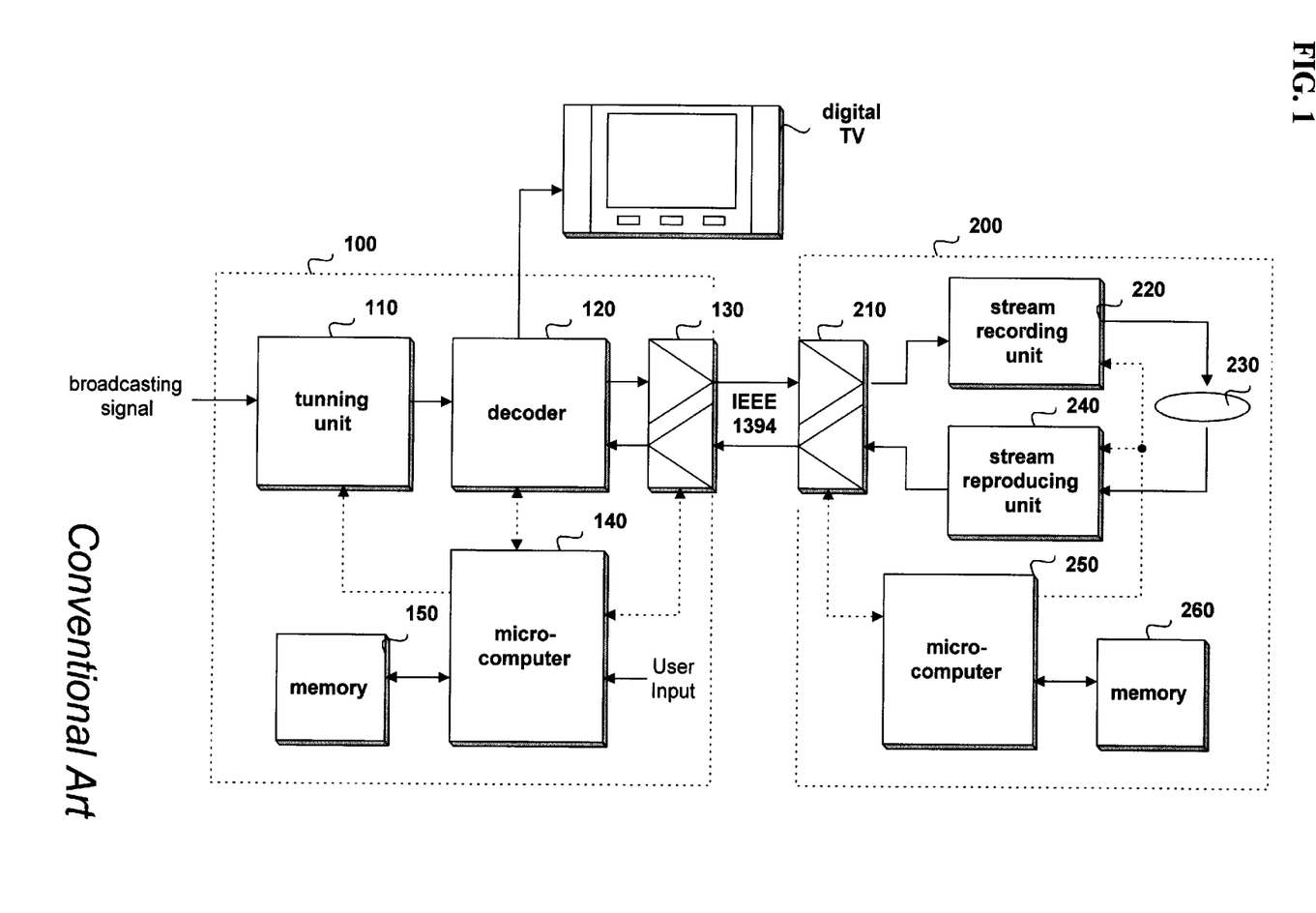
FIG. 1 is a block diagram of a general digital data stream recording system.

FIG. 1 depicts a block diagram of a general digital data stream recording system which consists of a set top box 100, a communication interface such as IEEE-1394, and a streamer 200. The set top box 100 receives transport streams, in which several programs are multiplexed, encoded by data encoders equipped in broadcasting stations and demultiplexes the received transport streams. After a data decoder 120 in the set top box 100 decodes the transport streams corresponding to a program tuned by a tuning unit 110 under the control of a microcomputer 140 to process a request from a user, it outputs the decoded transport streams to an A/V device such as a TV set for presentation. The set top box 100 may transmit the transport streams corresponding to a program chosen by a user to the streamer 200 through the IEEE-1394 interface so that the transport streams corresponding to the chosen program are recorded on a recording medium 230 such as a recordable DVD by the streamer 200.

According to another request from a user, the set top box 100 may receive a recorded program reproduced from the recording medium 230 by the streamer 200 through the IEEE-1394 communication interface, then the received program is presented on a TV set after being decoded by the decoder 120 in the set top box 100.

Meanwhile, for recording received digital broadcast signals on a recording medium, it is necessary to develop schemes for writing the received digital data streams in sectors of fixed size, organizing them on the recording medium, and creating management information for the recorded digital streams. However, no international definite standard for such schemes is available yet and thus various methods have been proposed by relevant developers.

One of the proposed methods for recording digital data streams and creating their management information will be explained with reference to accompanying drawings.

Figure 2:
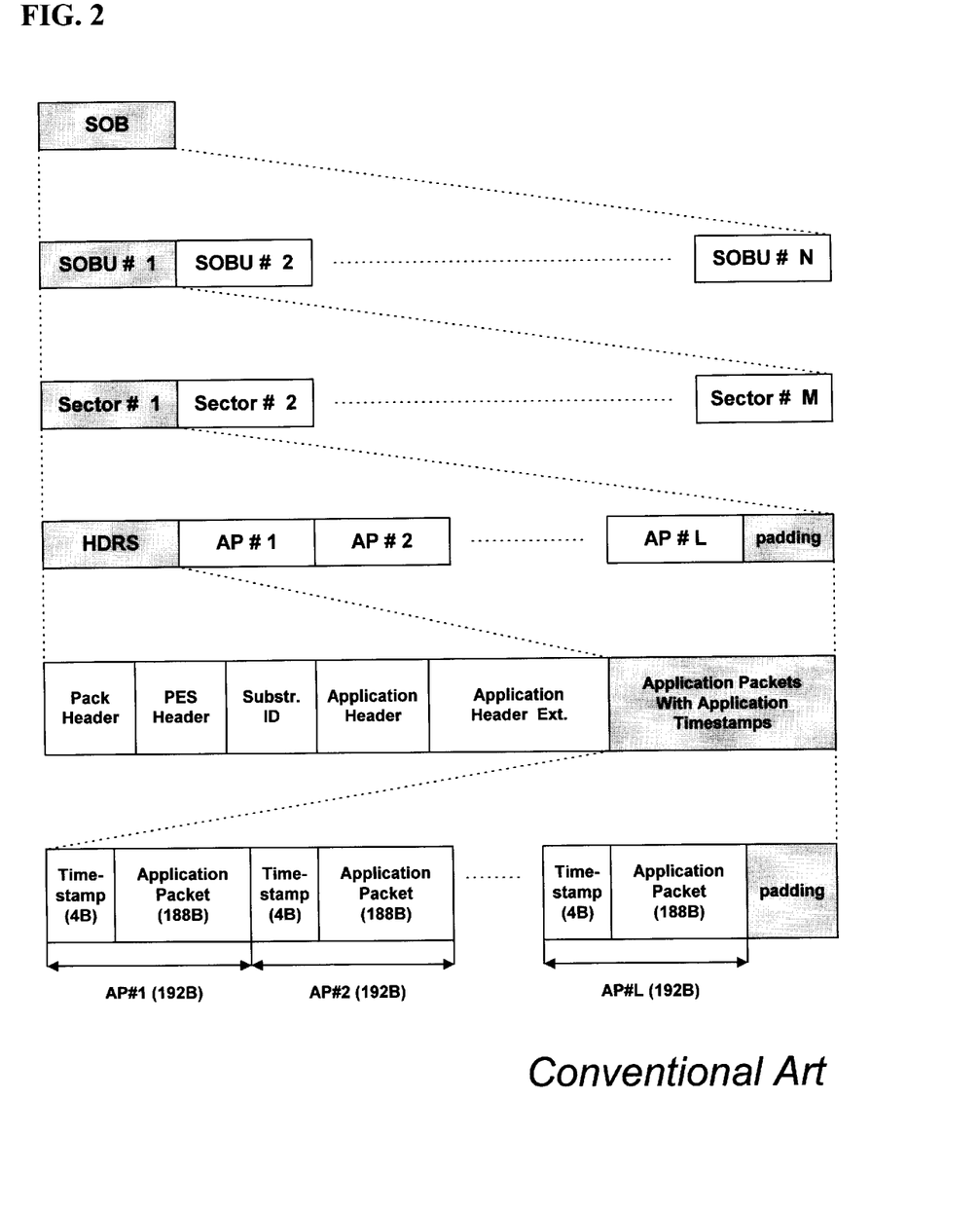
FIG. 2 is a pictorial representation for the syntax of recorded digital data stream.

FIG. 2 depicts the recording syntax for digital data streams. A stream object (SOB), which is a recorded object created by a one-time recording, consists of a plurality of stream object units (SOBUs), and each SOBU is recorded in a plurality of sectors. A single sector, whose size is 2048 bytes, can accept a plurality of application packets (APs) whose size is 192 bytes and header information HDRS regarding the written application packets. The AP consists of a 4-byte time stamp indicating the packet arrival time and a 188-byte data packet.

Therefore, a 2048-byte sector may be filled with a header information HDRS, several application packets (APs), and null data area if necessary, as shown in FIG. 2. The area filled with null data is called as padding area and its size varies.

Figure 3:
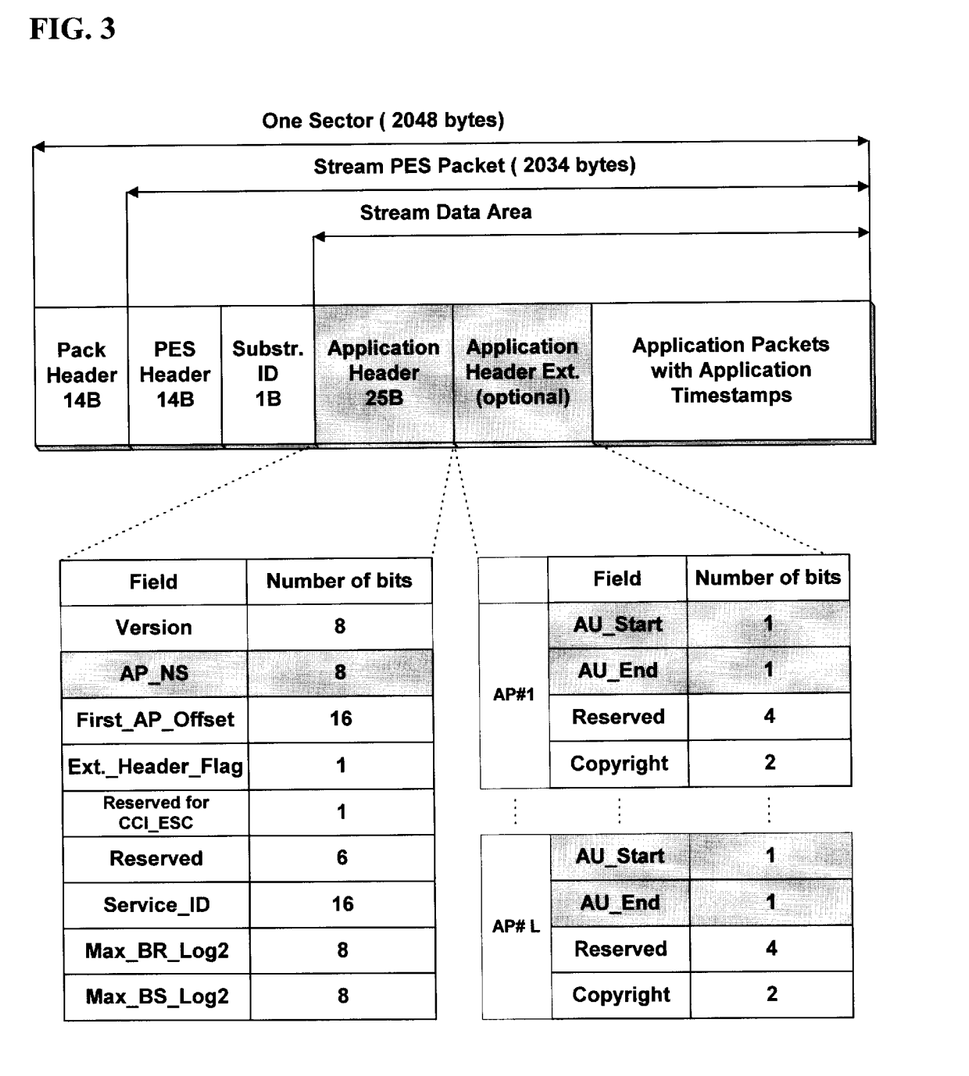
FIG. 3 is a pictorial representation for the format of general application header information and application header extension information.

FIG. 3 shows the format of the application header information and application header extension information recorded in the header information HDRS. The application header information contains information on a plurality of application packets recorded in its own sector, and it comprises a field indicating a version of the header format, a field AP_NS indicating the number of application packets, and so on. The application header extension information, which is optional, requires 1 byte for each application packet recorded in its own sector, and it comprises fields AU_Start (Access Unit Start) and AU_End (Access Unit End) indicating whether a packet belongs to starting and ending of data stream unit such as Infra-coded picture (referred as 'I-Picture' hereinafter) data which is accessible at random, respectively; a reserved field; and a field for copyright.

Figure 4:
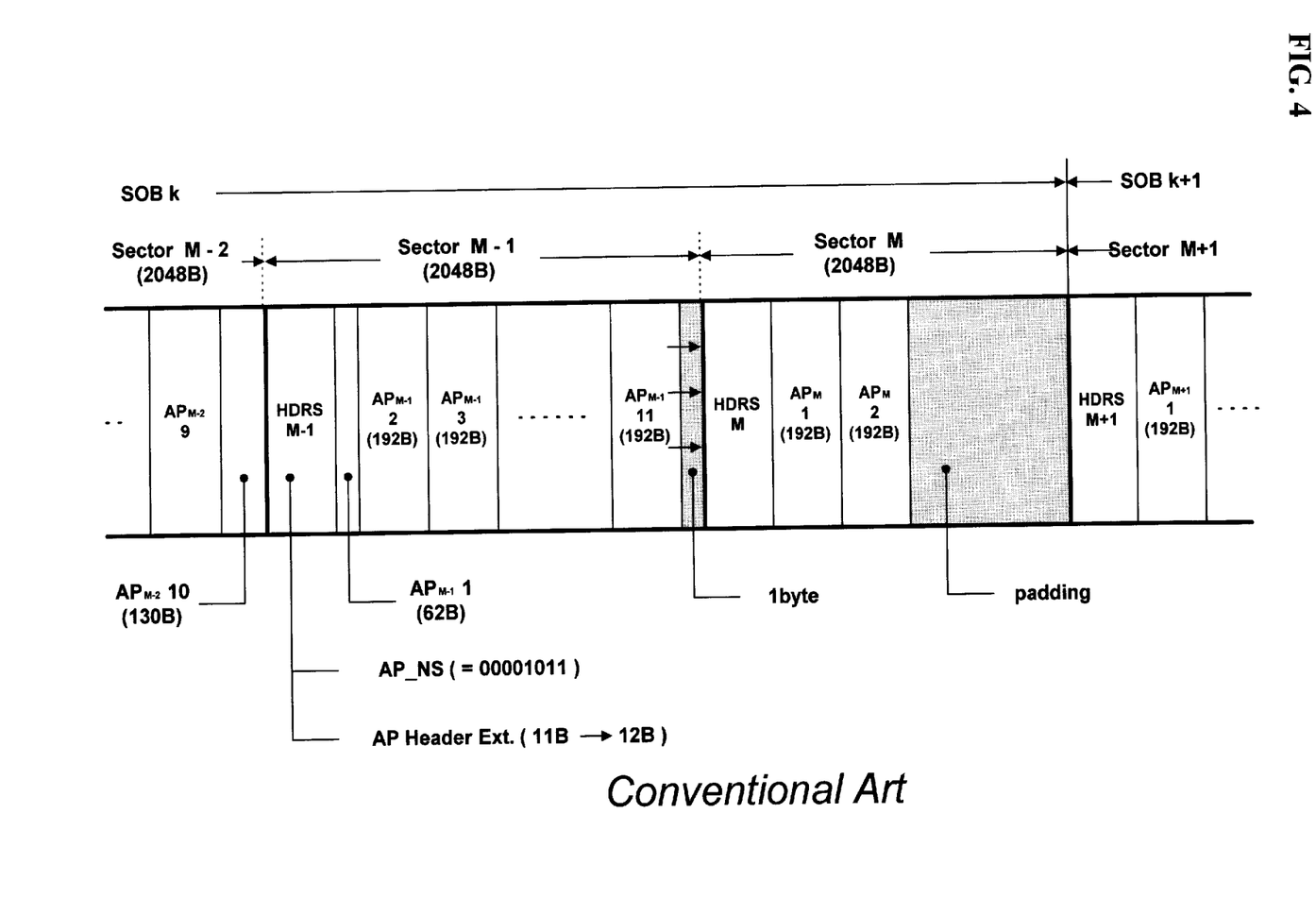
FIG. 4 shows a conventional method of recording digital data streams in sectors.

The FIG. 4 shows a digital stream recording example by a recently proposed method for recording application packets in sectors. The method of FIG. 4 divides an application packet into two parts if the remaining area of a sector cannot accept a single application packet, and records the first part whose size is equal to the remaining area in the current sector and the second part in the next sector. However, the remaining area of the last sector belonging to a SOB is filled with null data. According to this method, a 2048-byte sector can be wholly used as recording area except the last sector.

The recording example of FIG. 4 is explained in more detail to make the recently proposed method be understood better.

Since the remaining area of the sector M-2 is smaller than a single AP, a 192-byte AP is divided into 130-byte and 62-byte parts. The first 130-byte part of the divided application packet is recorded as the last recorded packet $AP_{M-2}$ #10 of the sector M-2 and the second 62-byte part is recorded as the first recorded packet $AP_{M-1}$ #1 of the sector M-1. Then, 10-byte application header extension information for all application packets recorded in the sector M-2 including the partial application packet $AP_{M-2}$ #10 is created and recorded in the header area HDRS, and a value of 00001010b (10 in decimal) is written in the field AP_NS of the application header information.

Meanwhile, the sector M-1 contains the second 62-byte part as the first recorded packet $AP_{M-1}$ #1 and 10 application packets $AP_{M-1}$ #2 to #11 whose 192-byte data are all recorded in the sector M-1, 54-byte (=14+14+1+15) header information which is explained above referring to FIG. 3, and 11-byte application header extension information which is generated and recorded for 11 application packets, so that 2047 bytes (=62+1920+54+11) of the sector M-1 are used for data recording and 1 byte remains in the sector M-1.

Accordingly, to use the whole 2048-byte sector, the next application packet of 192 bytes should be divided into 1 byte and 191 bytes, and 1-byte new application header extension information corresponding to the application packet whose the leading 1 byte is to be recorded in the sector M-1 should be generated and added in the sector M-1.

However, if 1-byte application header extension information is added in the sector M-1, the sector becomes full and the next application packet to be divided should be recorded in the next sector M. In this case, the application packet recorded in the sector M corresponds to the header extension information which is recorded in the different sector, and there occurs a problem for recording the number of packets recorded in one sector. That is, if the number of the APs recorded in the sector M-1 is written in the packet number field AP_NS, the written number is not equal to the number of header extension information in that sector, and if the number of header extension information is written in the field AP_NS, the written number is different from the number of the APs recorded fully and partially in that sector.

To avoid such problems, the 1-byte header extension information should be inevitably recorded in the next sector M. However, if the 1-byte header extension information is recorded in the next sector M, the sector M-1 leaves 1 byte unused, which causes mismatch with the provisional standard specification of stream recording that a sector is fully used without unwritten area if the sector is not the final one of a SOB.

SUMMARY OF THE INVENTION

It is an object of the present invention to provide method and apparatus for recording digital data streams and their management information which record stream packets and management information as maintaining one-to-one correspondence between stream packets and their management information in the same sector even if the remaining size of a sector becomes equal to the size of management information for a single stream packet.

It is another object of the present invention to provide method and apparatus for recording digital data streams and their management information which can make the value of information for indicating the number of stream packets recorded in a sector coincide with both numbers of management information and stream packets even if the remaining size of a sector becomes equal to the size of management information for a single stream packet.

The method for recording digital data streams and their management information in accordance with the present invention comprises the steps of creating header information of a sector including management information which is created in the basis of one-to-one correspondence with each transport stream unit to be recorded within the sector; comparing sizes of the created header information and transport stream units to be recorded with the size of the sector; appending a invalid header data to the created header information to maintain correspondence between each transport stream unit to be recorded in the sector and its management information based upon the compared result; and recording information indicating whether the invalid head data is appended or not in the header information of the sector.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 5:
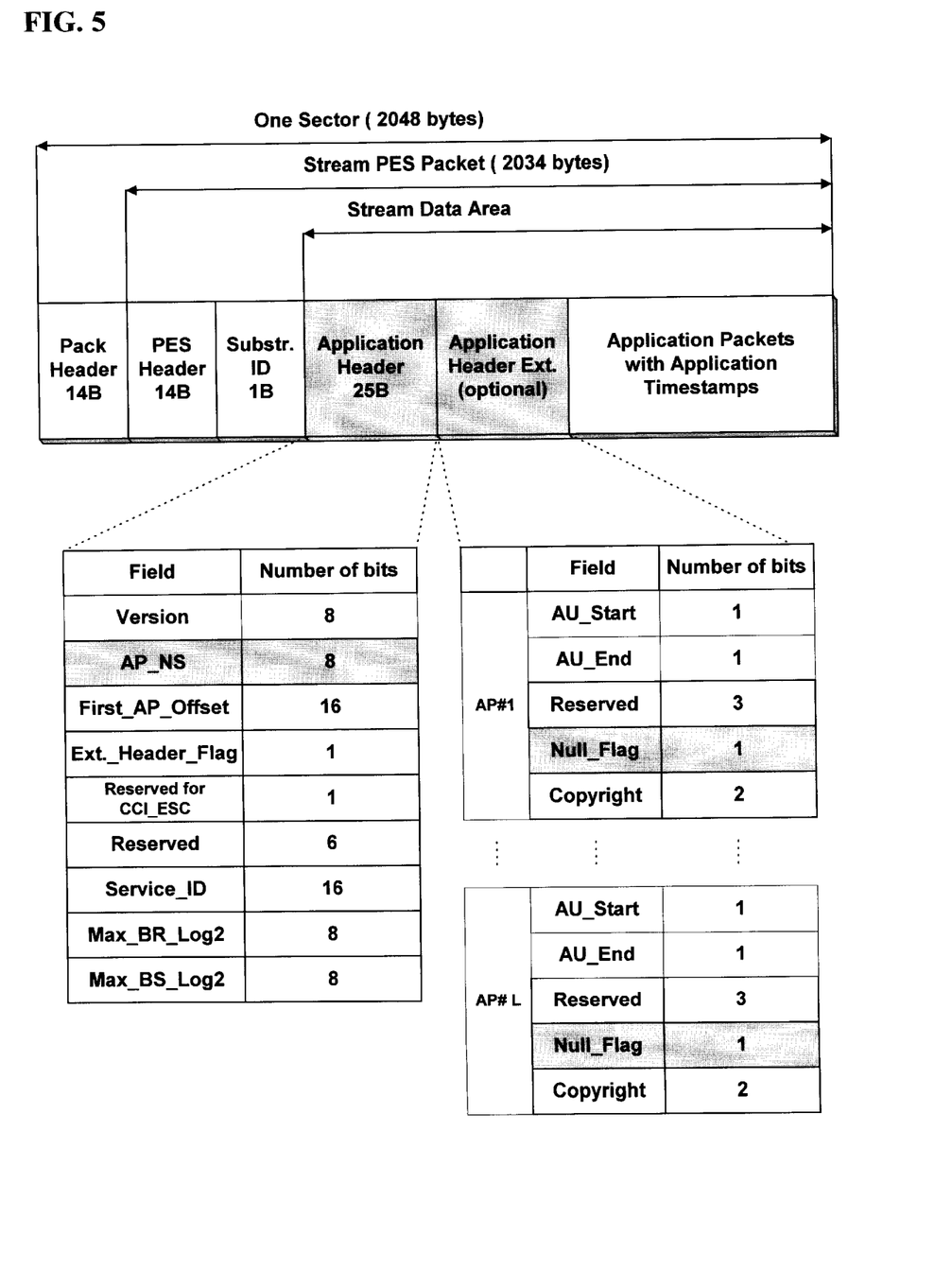
FIG. 5 is a pictorial representation for the syntax of application header information and application header extension information according to the present invention.

FIG. 5 is a pictorial representation of application header information and application header extension information according to the present invention. As described above referring to FIGS. 2 and 3, the application header information contains information on a plurality of application packets recorded in its own sector, and it comprises a field indicating a version of the header format, a field AP_NS indicating the number of application packets, and so on. The application header extension information, which is optional, requires 1 byte for each application packet recorded in its own sector, and it comprises fields AU_Start (Access Unit Start) and AU_End (Access Unit End) indicating whether a corresponding packet is starting and ending of data stream unit such as I-Picture data which is accessible at random, respectively; a reserved field; a field for copyright; and a validity information field 'Null_Flag' indicating whether the application header extension information is valid or not. All of 1-byte application header extension information are recorded before the APs which are composed of 4-byte time stamp and the 188-byte data packet individually.

The method embodying the present invention writes one-bit validity flag showing effectiveness of the application header extension information in all the application header extension information, and counts the number of the application header extension information recorded in the sector based upon of the values of the validity flags, then records the counted value in the field AP_NS. The determining and recording operation for the validity information of the bit-sized field Null_Flag and the number information of the field AP-NS is described with reference to the recording system shown in FIG. 1.

Figure 6:
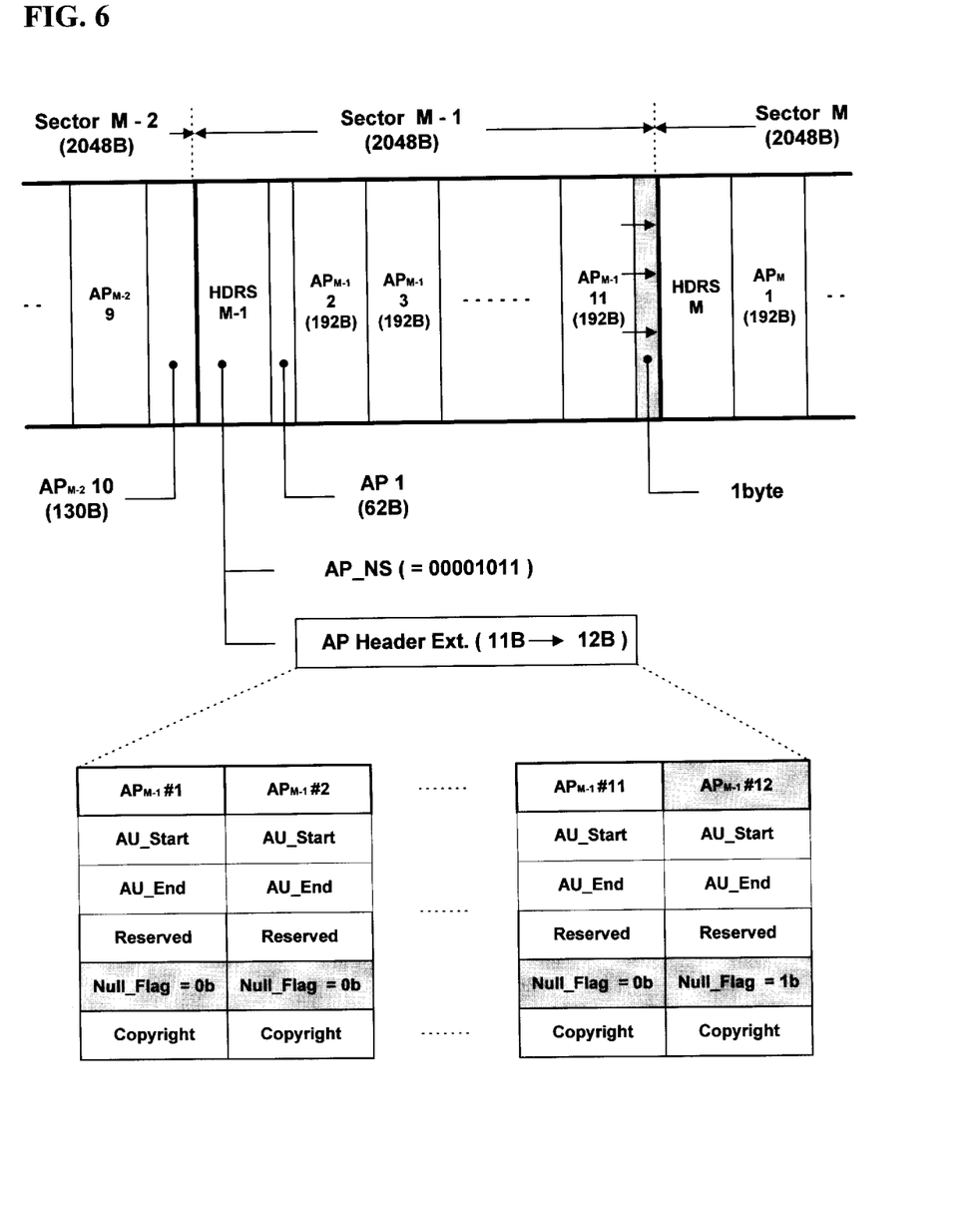
FIG. 6 shows a recording example according to the present invention.

FIG. 6 shows a recording example according to the present invention. To record digital streams and their management information like the format shown in FIG. 6, the streamer 200 receives the transport stream packets from the set top box 100 through the communication interface 210 and adds arrival time to each transport stream packet, then records them sequentially in a 2048-byte sector without unused area of null data. While recording, the stream recording unit 220 divides a single application packet at the border of a sector and records two divided partial packets across two sectors through an internal optical pickup, and pads null data in the remaining area of the last sector belonging to a SOB.

Meanwhile, the control unit 250 is checking both sizes of a received digital stream packet and the remaining area in a current sector of a recording medium 230 to record the packet in. As shown in FIG. 6, if 130 bytes remain in the current sector to write the received packet in so that the remaining area can not accept a full application packet, the control unit 250 informs the stream recording unit 220 of the fact that the remaining size is small by 62 bytes to accept a packet. Then, the stream recording unit 220 divides the 192-byte application packet into 130 bytes and 62 bytes based upon the informed fact, and records them as the last recording packet $AP_{M-2}$ #10 of the current sector M-2 and as the first recording packet $AP_{M-1}$ #1 of the next sector M-1, respectively.

For the application header extension information of the sector M-2, the control unit 250 produces 10-byte application header extension information for the 10 application packets including the partial application packet $AP_{M-2}$ #10 and controls the stream recording unit 220 to record the produced 10-byte application header extension information. Also, the control unit 250 makes a binary value of 00001010b (10 in decimal) representing the number of the recorded APs be written in the application packet number field AP_NS of the application header information.

However, the sector M-1 contains the first partial application packet $AP_{M-1}$ #1 of 62 bytes, 10 application packets $AP_{M-1}$ #2 to #11 of full size, 54-byte (=14+14+1+15) header information, and 11-byte application header extension information produced corresponding to the 11 application packets. According to these contents belonging to the sector M-1, the 2047 (=62+1920+54+11) bytes are to be used in the sector M-1, so that the sector M-1 has a remaining area.

If the size of the remaining area is same with the size of header extension information for a single AP, that is, if the size of the remaining area is 1 byte as in the sector M-1, the control unit 250 produces a invalid header data according to the following procedure and controls the stream recording unit 220 to record the invalid header data.

The control unit 250 should divide the received 192-byte application packet into 1 byte and 191 bytes to use the whole area of the 2048-byte sector M-1. However, if the divided partial AP of 1 byte is to be recorded in the sector M-1, a new one-byte application header extension information corresponding the 1-byte partial AP should be also added in the sector M-1, so that the sector M-1 lacks one byte.

Accordingly, the control unit 250 produces a 1-byte invalid header data and controls the stream recording unit 220 to record the produced 1-byte invalid header data in the sector M-1 to fill up the 2048 bytes, therefore, the received 192-byte application packet is recorded in the next sector M without being divided.

The invalid header data recorded in sector M-1 is application header extension information, however, it has not correspondence with a AP. Thus, the invalid header data should be distinguished from normal application header extension information. To indicate the validity of application header extension information, the value 0b or 1b is written in the validity information bit Null_Flag which is one bit of the header extension information field, wherein the value 1b represents that application header extension information is not corresponding to a AP. Therefore, in the sector M-1, the application header extension information with Null_Flag=1b can be differentiated from the 11 application header extension information with Null_Flag=0b produced corresponding to the effective 11 application packets $AP_{M-1}$ #1 and $AP_{M-1}$ #2 to #11.

Accordingly, although 11 application packets and 12 application header extension information are recorded in the sector M-1, the last application header extension information recorded only for fully using of a sector can be discriminated based on the value of the bit Null_Flag. After counting the effective application header extension information whose the validity bit is 0b, the value of 00001011b (11 in decimal) representing the number of the effective 11 application header extension information or the number of the 11 application packets recorded in the sector M-1 is recorded in the field AP_NS to indicate the number of APs for the sector M-1.

The method and apparatus for recording digital data stream and management information in accordance with the present invention record invalid header data distinguishable from the normal application header extension information in front of the application packets as explained in detail hereinbefore, if the remaining area of a sector is equal to application header extension information in size. Accordingly, this method of the present invention records effective application header extension information whose the number coincides with the number of APs recorded in the same sector, so that prevents mismatch between the value to be written in the field AP_NS to indicate the number of application packets and either of the number of the recorded APs and the number of application header extension information. Moreover, this method does not leave any unused area to pad null data at the border of a sector, and, thereby satisfies the standard specification for a digital data stream recording medium.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording received predetermined-sized transport stream units in predetermined-sized sectors, comprising the steps of:
   (a) determining whether to divide a single transport unit to record it across two consecutive sectors;
   (b) creating header information of a preceding sector of the two including management information which is created in the basis of one-to-one correspondence with each transport stream unit to be recorded within the sector, based upon the determining result of said step (a);
   (c) comparing sizes of the created header information and the received transport units to be recorded with the size of a sector;
   (d) appending a invalid header data to the created header information to prevent a conflict in the correspondence between each transport stream unit to be recorded in the preceding sector and its management information, based upon the compared result; and (e) recording information indicating whether the invalid head data is appended or not in the header information of the preceding sector.

2. The method set forth in claim 1, wherein said step (a) determines to pad null data in the remaining area of a sector after recording the received transport stream unit in the sector if the recorded transport stream unit is the final unit belonging to a stream object.

3. The method set forth in claim 1, wherein said management information includes the information on whether a transport stream unit contains Infra-coded picture data or not.

4. The method set forth in claim 1, wherein said header information includes the information on the number of transport stream units recorded in a sector.

5. The method set forth in claim 1, wherein said conflict in the correspondence means the situation that when the size difference compared in said step (c) is equal to the size of the management information for a single transport stream unit, the preceding sector lacks area for management information if a single transport stream unit is to be recorded after divided at the border of the preceding sector, and on the contrary, it has to leave an area unused if the transport stream unit is to be recorded in the next sector without being divided.

6. The method set forth in claim 1, wherein said step (d) appends the invalid header data to an area for the management information.

7. The method set forth in claim 1, further comprising a step of:

(f) writing information on the number of the transport stream packets recorded in the preceding sector in the header information.

8. The method set forth in claim 7, wherein the number written in the said step (f) is the number of management information excluding the invalid header data, the management information being produced in the basis of one-to-one correspondence with transport stream units recorded in the preceding sector.

9. A method for recording received predetermined-sized transport stream units in a predetermined-sized sector, comprising the steps of:

(a) determining whether to divide a single transport unit to record it across two consecutive sectors;

(b) creating header information of a preceding sector of the two including management information which is created in the basis of one-to-one correspondence with each transport stream unit to be recorded within the sector based upon the determining result of said step (a);

(c) comparing sizes of the created header information and the received transport units to be recorded with the size of a sector;

(d) appending a invalid header data of which size is equal to the size of the management information produced in the basis of one-to-one correspondence with the transport stream unit; and (e) recording information indicating whether the invalid head data is appended or not in the header information of the preceding sector.

10. The method set forth in claim 9, wherein said step (a) determines to pad null data in the remaining area of a sector after recording the received transport stream unit in the sector if the recorded transport stream unit is the final unit belonging to a stream object.

11. The method set forth in claim 9, wherein said management information includes the information on whether a transport stream unit contains Infra-coded picture data or not.

12. The method set forth in claim 9, wherein said header information includes the information on the number of transport stream units recorded in a sector.

13. The method set forth in claim 9, wherein said step (d) appends the invalid header data to an area for the management information.

14. The method set forth in claim 9, further comprising a step of:

(f) writing information on the number of the transport stream packets recorded in the preceding sector in the header information.

15. The method set forth in claim 14, wherein the number written in the said step (f) is the number of management information excluding the invalid header data, the management information being produced in the basis of one-to-one correspondence with transport stream units recorded in the preceding sector.

16. An apparatus for recording received digital data streams in a recording medium, comprising:

a receiving means for receiving transport stream units as adding their arrival times;

a recording means for recording the transport units added their arrival times in predetermined-sized sectors of the recording medium so that the sectors may be entirely used; and a controlling means for creating header information of a sector including management information which is created in the basis of one-to-one correspondence with each transport stream unit to be recorded within the sector, inserting a invalid header data in the created header information to maintain the correspondence between each transport stream unit to be recorded in the sector and its management information, and controlling said recording means to record the created header information in which the invalid header data is inserted in the sector.

17. The apparatus set forth in claim 16, wherein said recording means pads null data in the remaining area of a sector after recording a received transport stream unit in the sector if the recorded transport stream unit is the final unit belonging to a stream object.

18. The apparatus set forth in claim 16, wherein said management information includes the information on whether a transport stream unit contains Infra-coded picture data or not.

19. The apparatus set forth in claim 16, wherein said header information includes the information on the number of transport stream units recorded in a sector.

20. An apparatus for recording received digital data streams in a recording medium, comprising:

a receiving means for receiving transport stream units as adding their arrival times;

a recording means for recording the transport units added their arrival times in predetermined-sized sectors of the recording medium so that the sectors may be entirely used; and a controlling means for creating header information of a sector including management information which is created in the basis of one-to-one correspondence with each transport stream unit to be recorded within the sector, inserting a invalid header data in the created header information if the size of a remaining area of the sector is equal to the size of the management information, and controlling said recording means to record the created header information in which the invalid header data is inserted in the sector.

* * * * *